United States Patent Office 3,266,904
Patented August 16, 1966

3,266,904
LOW CALORIC FATTY SPREAD
Hendrik Jan Duin and Jacob Arie Schaap, Vlaardingen, Netherlands, assignors to Lever Brothers Company, New York, N.Y., a corporation of Maine
No Drawing. Filed Mar. 18, 1963, Ser. No. 266,085
Claims priority, application Great Britain, Mar. 23, 1962, 11,285/62
12 Claims. (Cl. 99—123)

The invention relates to fatty compositions, and especially to fatty compositions suitable for use as a spread for bread and sandwiches, and containing, as compared with margarine and butter, a relatively lower percentage of fat (not more than about 60%) and a relatively high percentage of protein (not less than about 2%), the balance being composed substantially of water or whey, and the compositions being, as compared with butter or margarine, of relatively low energy content. Such compositions will be referred to below as "low calorie spreads."

In this specification unless otherwise stated all percentages and proportions are by weight.

The primary object of the present invention is to provide a low calorie spread which is a water-in-oil dispersion and which has a texture and spreadability similar to that of margarine and butter. Such products are believed to be novel. In devising a method for making them, the condition that the aqueous phase, containing the protein, must be the disperse phase, the fat providing the continuous phase, presented considerable difficulty.

It is possible to make a spread by forming an oil-in-water emulsion of the fatty and aqueous components, since the formation of such an emulsion is furthered by the oil/water emulsion stabilizing properties of the proteins. Such a spread, however, is quite unsuitable for the present purpose, its keeping qualities being very limited, since the protein-containing aqueous phase forms an excellent medium for micro-organisms. Certain emulsifying agents are known to promote the formation of water-in-oil emulsions but these agents are apt to impart undesirable flavours to the product and their use may also be undesirable on physiological grounds.

It has now been found possible to prepare a fatty composition of the desired water-in-oil type—with a relatively low proportion of fat and a relatively high proportion of protein—which shows a striking resemblance in appearance and spreading properties with butter or margarine, while using emulsifying agents normal in margarine production, such as phosphatides and partial glycerides.

The compositions of the invention may contain from 40 to 55 or 60%, preferably about 50%, of fat, the rest being whey or water containing protein and added salts. The proportion of protein may range from 4 to 20%, and especially 10 to 15% of the water and preferably amounts to some 7 to 8% of the total weight of the composition. Small proportions of carbohydrates, for instance up to about 2 or 3% of the total weight, and flavouring agents, may also be present. Suitable emulsifiers, for instance mono-glycerides (this term being used to include mixtures of mono- and di-glycerides) and lecithin will also be present. The continuous phase is formed by the fat. The energy content of the fat in calories per 100 g. may be less than 400 and will generally be less than 600, for instance 400 to 500 or 550.

The composition of the fat used may be chosen according to the demands made on the product. Mixtures of fats, including fats modified by hydrogenation, fractionation or interesterification, such as are used to constitute the fat phase in margarine can be used. Spreads can also be manufactured by using special fat mixture such as (1) Mixtures characterised by a high linoleic acid content, for instance 20 to 30% or more, (2) Mixtures characterised by a low content of unsaturated transacids, for instance 0 to 5%, (3) Butterfat.

In formulating the fat mixture (as in formualting that of a margarine) due regard must be had to obtaining the desired consistency so that, for instance, the product is spreadable at the temperatures at which it is to be used.

Although vegetable and animal proteins can be used, it is preferred to use animal proteins, such as milk casein and blood albumin, which have a good taste, a high nutritional value and therefore contribute to the quality of the product.

The products which the invention provides are water-in-oil dispersions which may be formulated so as to have a long shelf life, a very good spreadability as well as a neutral taste, and are quite acceptable from a physiological point of view. They are of substantially lower energy content than butter or margarine and may be formulated with fats containing relatively high proportions of so called essential fatty acids. These properties make them of considerable interest interest having regard to present views on arteriosclerosis and to the desirability of limiting the intake of high-energy foods. Apart from their use for spreading onto bread they may be used as dressings for vegetables and also in cake baking.

The products of the invention can be prepared by first making an oil-in-water emulsion of the fatty and aqueous phases at a temperature at which the fatty phase is liquid, and subsequently effecting a phase-inversion of this emulsion in a closed system by cooling and mechanical treatment. This phase-inversion may, for instance, be effected in a scraped-surface heat exchanger apparatus capable of cooling and kneading the mixture at the same time such as a votator. Other forms of apparatus, however, may also be used, for example the so-called complector, provided the operations are carried out in a closed system. The degree of working and cooling of the fatty composition must be carefully adapted to the properties of the fatty composition, as otherwise the inversion is incomplete or is not obtained at all.

An alternative method of preparing the composition is to form a water-in-oil dispersion directly, by injecting the aqueous phase into the pre-cooled fat phase while this is passing through a closed system in which the mixture is agitated and cooled, for instance by passage through a blender followed by votator A and B units.

The preparation of a satisfactory product according to the invention depends to a high degree on the preparation of the aqueous phase which contains the protein. Especially a relatively high protein content of the water phase may cause difficulties, as the viscosity of the water rapidly increases with the protein content. Furthermore the proteins themselves must be of high quality to obtain a high quality product. For this reason it is preferred to carry out the further processing of the protein immediately after it is isolated from the skimmed milk.

Since the product according to the invention contains substantial amounts of protein, suitable precautions should, of course, be taken to prevent bacterial deterioration of the product. The fact that the protein-containing aqueous phase is the disperse phase in the product has a valuable effect on the keeping properties of the product but pasteurisation of the total water phase, e.g. for about 40 minutes at 70° C. is a requirement to obtain a well keepable product. It is also desirable to incorporate salt in the aqueous phase (it should be added in aqueous solution thereto to prevent concentrated salt droplets from being taken up in the oil droplets of the emulsion) and to ensure that the pH is on the acid side. Incorporation of sorbic acid is also useful in improving keepability and other suitable preservatives, for instance tocopherols, may be incorporated. A salt content of at least 0.50% (percentage calculated on the water phase) at a pH of 5.2 or lower gives a very suitable product. In packaging the product aluminium foil or other materials of very low permeability to water, water vapour and air should preferably be used.

In preparing the aqueous phase, the protein, for example casein, is precipitated (for instance from skimmed milk) with acid, various non-toxic organic or inorganic acids, such as lactic acid, citric acid and hydrochloric acid, being suitable. The casein flakes may be washed to remove lactose and any excess of acid, after which the precipitate is concentrated by filtering or centrifuging. If the nature of the product required is such that washing is unnecessary, concentration may be effected by flotation as described below. After washing and concentrating the precipitate the acid casein may be brought into a colloidal solution with the aid of alkaline reacting agents, such as sodium hydroxide, sodium phosphate, sodium bicarbonate or sodium citrate. The colloidal solution may then be heated to about 65°–80° C., in order to make it pourable, and kept at this temperature for 10–30 minutes, to effect pasteurisation. The pH should lie between 5 and 6, preferably between 5.2 and 5.4. A higher pH is not recommended, as the microbiological keepability of the spread may be affected.

In preparing the protein for use in the composition of the invention a particularly desirable method is that referred to above as flotation. In this method the aqueous medium (for example skimmed milk) from which the protein is to be precipitated is vigorously stirred so as to whip into it a considerable proportion of air. Then, when the precipitant is rapidly added the protein is precipitated in the form of a somewhat coherent curd that floats on the whey and from which the whey can easily be drained off without filtration.

The following examples, in which the parts are by weight illustrate the invention:

*Example 1*

A spread was prepared, the fatty phase of which consisted of a mixture of sunflower oil, hydrogenated groundnut oil and hydrogenated palm oil, and the protein of which was casein. The water phase was prepared as follows:

To 300 kg. of fresh, pasteurised skimmed milk at a temperature of 25° C. there was added 13.5 l. of aqueous citric acid containing 100 g. of citric acid monohydrate per litre to bring the pH to 4.6–4.8. With slow stirring of the mixture a precipitate of casein was obtained. After the mixture had settled, the whey (180 kg.) was drawn off. Subsequently the casein was washed twice with 120 kg. of tap water, until the acidity of the wash-water was not more than 2.0 ml. N sodium hydroxide/100 ml. The washed curd was filtered in bags of filtercloth till the protein concentration was more than 16%. With vigorous stirring 1250 ml. of N sodium hydroxide was added and after thorough mixing the mixture was slowly heated to 70° C. and kept at this temperature for about 30 minutes. After this, 0.27% of potassium sorbate was added and the water phase thus prepared was cooled to 50° C. About 50 kg. of water phase was obtained with a protein content of 15.5–16% (which may be adjusted by the addition of water) and a pH of 5.3–5.5.

The fatty phase consisted of a mixture of 55 parts of sunflower oil, 33 parts of hydrogenated groundnut oil (slip-melting point 35° C.) and 12 parts of hydrogenated palm oil (slip-melting point 45° C.). To 100 kg. of this fatty phase were added 0.3 kg. of soybean lecithin and 5 g. of a 20% beta-carotene dispersion in oil and 1 kg. of distilled monoglycerides of palmitic and stearic acids. The monoglyceride mixture used contained 85% of the monoglycerides of palmitic and stearic acids, in the ratio of 55:45, 9% of the diglycerides, 1% of free fatty acids and 5% of moisture and free glycerine. There was also incorporated in the fat phase 0.005 part of a 20% beta-carotene dispersion in edible oil containing flavouring agent and vitamin concentrate.

With the aid of a high speed stirrer 50 kg. of the fatty phase was dispersed at a temperature of 50° C. in 48 kg. of the water phase until an oil-in-water emulsion was obtained. The pH of the emulsion was adjusted to 5.15–5.20, with the aid of a solution of lactic acid (about 600 ml. of 10% lactic acid), after which 1.67 l. of brine (300 g. common salt/l.) were added. This oil-in-water emulsion was pumped into a closed system consisting of a votator A-unit, a blender with rod-shaped beaters, a second A-unit and a votator B-unit. By cooling and mechanical treatment of the oil-in-water emulsion, a water-in-oil dispersion was obtained, which could immediately be packed. The first A-unit had a cooling surface of 5.3 dm.² and a volume of 300 ml. This speed of rotation of the scrapers was 750 r.p.m. The blender had a volume of 700 ml., the speed of rotation of the pins being 750 r.p.m. The second A-unit had a cooling surface of 2.3 dm.² and a volume of 170 ml. The speed of the scrapers was 750 r.p.m. The B-unit consisted of a tube with a rectangular cross-section of 6 x 4 cm.² and a length of 20 cm. The cooling was effected with a calcium chloride solution at a temperature of −15° to −18° C. The throughput was 40 kg. per hour. The mixture was introduced into the first A-unit at a temperature of 40° C. and left this unit at a temperature of 18°–20° C. After the B-unit the temperature was 15°–16° C. The product obtained showed a surprising resemblance to butter and margarine as regards appearance and spreadability. It melted quickly in the mouth and had a slightly aromatic, slightly salt, neutral taste, and was suitable for all sorts of sandwiches. The product did not sweat nor show any oil exudation at room temperature. After 6 weeks' storage at 20° C. no microbiological growth could be detected.

In baking cakes a somewhat larger quantity of the product should be used than when butter or margarine is used, but on the other hand less protein, in the form of eggs, is needed to obtain a cake of a good structure. The product has also certain advantages in preparing ice cream as it contains fat and protein and has only a small content of lactose compared with condensed milk.

*Example 2*

To 60 kg. of fresh, pasteurised skimmed milk at a temperature of 35° C., 2750 ml. of aqueous citric acid solution of the concentration specified in Example 1 was added with stirring. The whey (52 kg.) was drawn off through a sieve plate, and to the casein curd 525 ml. N sodium hydroxide was added. After thorough mixing the mass was heated for 30 min. to 70° C. and subsequently cooled down to 50° C.

A fatty phase was prepared consisting of a mixture of 55 parts of sunflower oil, 33 parts of hydrogenated whale oil (slip-melting point 35° C.), 12 parts of hydrogenated palm oil (slip-melting point 45° C.). To 100 kg. of this fatty phase was added 1 kg. of monoglycerides, 0.3 kg. of soyabean lecithin, 0.3 kg. of sorbic acid and 5 g. of a 20% beta-carotene dispersion in oil, as well as flavours and vitamin concentrates. 12 kg. of this fatty phase at a temperature of 50° C. was dispersed in the water phase, and to the oil-in-water emulsion obtained 400 ml. of brine (300 g. common salt/l.) was added. This oil-in-water emulsion was chilled and worked in a closed system as described in Example 1. An excellent product was obtained.

It will be noted by comparison with Example 1, that the casein, after being precipitated with citric acid, was not washed, but somewhat more lye had to be added. This method gives a higher yield of protein and also a considerable saving of time. Furthermore, in view of the fact that sorbic acid was added to the fatty phase, it was not necessary to lower the pH of the oil-in-water emulsion by adding lactic acid. The product obtained contained 2% of lactose, which indicates a lower moisture content.

Example 3

The same water phase was prepared as in Example 2. The fatty phase consisted of butter fat, obtained by melting butter, to which was added, per 100 kg., 1 kg. of monoglyceride, 0.3 kg. of soyabean lecithin, 0.3 kg. of sorbic acid and flavouring concentrate.

12 kg. of this fatty phase was dispersed into 11.5 kg. of water phase at a temperature of 50° C. and to the oil-in-water emulsion obtained 400 ml. of brine (300 g. common salt/l.) was added.

This oil-in-water was chilled and worked in a closed system as in Example 1 and a water-in-oil dispersion obtained.

The final product thus prepared had a very good spreadability.

Example 4

A fatty phase of the composition specified in Example 2 was fed at 40° C. to an A-unit of a votator. In a blender with rod-shaped beaters the cooled fatty phase issuing from the votator A-unit was mixed at 15° C. with a water phase prepared according to Example 2, after which the water-in-oil dispersion was further cooled in a second A-unit. The product leaving via a B-unit of the votator could immediately be packed mechanically.

Example 5

To 300 kg. of fresh, pasteurized skimmed milk at 35° C. 13.5 litres of aqueous citric acid solution containing 100 g. of citric acid monohydrate per litre was rapidly added while stirring vigorously with a propeller stirrer. During this operation so much air was beaten into the mixture that the precipitated casein floated quantitatively on the whey after stopping stirring immediately after the addition was complete. 250 kg. of clear whey could be easily drained.

2650 ml. of N sodium hydroxide solution was thoroughly mixed with the curd. The resulting mixture was heated to 70° C. and kept at this temperature for about half an hour. After adding 2.2 litres of sodium chloride solution containing 300 g. per litre, the aqueous phase was cooled below 25° C.

The fat phase was prepared from:

| | Parts |
|---|---|
| Sunflower oil | 55 |
| Groundnut oil, hydrogenated to slip-melting point of 35° C. | 33 |
| Palm oil, hydrogenated to a slip-melting point of 45° C. | 12 |
| Soyabean lecithin | 0.3 |
| Distilled monoglycerides | 1 |
| Sorbic acid | 0.3 |
| 20% beta-carotene dispersion in edible oil with flavouring agents and vitamin concentrate | 0.005 |

The fat phase was cooled by passing it through a votator-A unit of the same characteristics as the second A-unit of Example 1 cooled with brine at −15° C. and then through a blender as described in that example. Into the stream of pre-cooled fat passing through the blender was injected the aqueous phase at the same rate in kg./sec. From the blender the resulting water-in-oil emulsion passed in turn through a further votator-A unit of the same characteristics as the first A-unit of Example 1 and through a B-unit as described therein. The through put was 35 kg./hr. and the product emerged at 13 to 14° C. as a substantially solid mass which was immediately packed mechanically. In this process the fat phase emerging from the first A-unit is on the verge of crystallisation and this appears to be an important factor in obtaining a good product.

Example 6

The floating casein was obtained as described in the previous example. 250 g. of sodium bicarbonate was added and the curd thoroughly mixed. The resulting mixture was heated to 70° C. and kept at this temperature for about half an hour.

Sodium chloride solution was added and the water phase cooled to 25° C. was injected into the fat phase and the resulting emulsion was further processed as described in Example 5.

We claim:

1. A low-energy fatty composition suitable for spreading on bread, said composition comprising a water-in-fat emulsion in which the fat phase amounts to 40–60% of the total weight and is composed of edible fat emulsified with margarine emulsifiers consisting essentially of a mixture of partial glycerides and phosphatides and in which the aqueous phase contains as its major constituent 4–20% of its weight of a protein selected from the class consisting of casein and albumin.

2. A composition according to claim 1, wherein the protein compound amounts to 7–8% of the weight of the composition and the fat to 40–55% of the composition.

3. A composition according to claim 1, wherein the protein is milk casein.

4. A composition according to claim 1, wherein the protein is milk casein and the margarine emulsifier with which the fat is emulsified is a mixture comprising lecithin and partial glycerides of palmitic and stearic acids.

5. A composition according to claim 1, wherein the protein is milk casein, the fat is butterfat and the margarine emulsifier with which the fat is emulsified is a mixture comprising lecithin and partial glycerides of palmitic and stearic acids.

6. A composition according to claim 1, wherein the fat has a linoleic acid content of 20–30% by weight.

7. A composition according to claim 1, wherein the fat contains not more than 5% by weight of isomers of the natural unsaturated fatty acids.

8. Process for making a low energy fatty composition in the form of a fat-in-water emulsion suitable for spreading on bread and containing 40–60% by weight of fat and 4–20% by weight of a protein selected from the class consisting of casein and albumin, comprising the steps of emulsifying the fat with an aqueous phase containing the protein at a temperature at which the fat is liquid, and in the presence of 0.2–2%, by weight of the composition, of an emulsifier comprising partial glycerides of palmitic and stearic acids to form a fat-in-water emulsion, and subjecting the emulsion to phase-inversion by combined cooling and working in a closed system.

9. Process according to claim 8, wherein 0.1–0.4% lecithin based on the weight of the fat is also present during emulsification.

10. Process according to claim 8, wherein the aqueous phase is formed by precipitating casein from skimmed milk by lowering the pH to 4.6–4.8 by addition of the required amount of a non-toxic acid, the precipitate is concentrated by filtering until the casein concentration is more than 16%, the casein concentrate thus obtained is dispersed in an aqueous alkaline solution to form a colloidal solution, this colloidal solution is pasteurized, the pH is adjusted to between 5.2 and 5.4 by addition of the required amount of non-toxic acid and the fat phase containing the emulsifier is stirred into the aqueous phase at a temperature of 45 to 55° C.

11. Process according to claim 8, wherein the casein is precipitated from skimmed milk into which air has been whipped in a quantity that makes the casein float on the surface of the resulting whey.

12. Process according to claim 8, wherein the fat phase is precooled, and the aqueous phase is injected into the precooled fat phase while the latter is passed through a closed system, and the mixture is agitated and cooled.

References Cited by the Examiner

UNITED STATES PATENTS

| 1,302,486 | 4/1919 | Dunham | 99—63 |
| 1,431,937 | 10/1922 | Dunham | 99—20 |

(Other references on following page)

UNITED STATES PATENTS

| | | | |
|---|---|---|---|
| 2,034,056 | 3/1936 | Peebles | 99—20 X |
| 2,508,393 | 5/1950 | Jaeger | 99—123 |
| 2,619,423 | 11/1952 | Diamond | 99—144 |
| 2,622,984 | 12/1952 | Peebles | 99—118 X |
| 2,915,401 | 12/1959 | Khollenberg et al. | 99—122 |

FOREIGN PATENTS 739,270   10/1955   Great Britain.

OTHER REFERENCES

Bennett, Theory of Emulsions, 1947, Chemical Publ. Co., Brooklyn, N.Y., p. 69.

Schwitzer, Margarine and Other Food Fats, 1956, Interscience Publ., New York, pp. 240–254, 367.

USDA Circular No. 549, p. 56 (Food Compositions).

A. LOUIS MONACELL, *Primary Examiner.*

M. W. GREENSTEIN, *Assistant Examiner.*